US008501081B2

(12) United States Patent
Parish et al.

(10) Patent No.: US 8,501,081 B2
(45) Date of Patent: Aug. 6, 2013

(54) POLYCRYSTALLINE ALUMINA ARTICLES AND METHODS OF MANUFACTURE

(75) Inventors: Mark V. Parish, Hopkinton, MA (US); Marina R. Pascucci, Worcester, MA (US); William H. Rhodes, Lexington, MA (US)

(73) Assignee: Ceranova Corporation, Marlborough, MA (US)

( * ) Notice: Subject to any disclaimer, the term of this patent is extended or adjusted under 35 U.S.C. 154(b) by 427 days.

(21) Appl. No.: 12/257,510

(22) Filed: Oct. 24, 2008

(65) Prior Publication Data

US 2010/0025896 A1    Feb. 4, 2010

Related U.S. Application Data

(62) Division of application No. 11/240,069, filed on Sep. 30, 2005, now Pat. No. 7,456,122.

(60) Provisional application No. 60/522,438, filed on Oct. 1, 2004.

(51) Int. Cl.
*C04B 33/32* (2006.01)
*C04B 35/115* (2006.01)

(52) U.S. Cl.
USPC ............ 264/654; 264/604; 264/664; 264/910

(58) Field of Classification Search
USPC ................................. 264/604, 910, 654, 664
See application file for complete search history.

(56) References Cited

U.S. PATENT DOCUMENTS

| | | | |
|---|---|---|---|
| 3,026,210 A | | 3/1962 | Coble |
| 3,377,176 A | | 4/1968 | Wolkodoff et al. |
| 3,792,142 A | * | 2/1974 | Kobayashi et al. ........... 264/1.21 |
| 3,899,560 A | * | 8/1975 | Sellers et al. ................. 264/663 |
| 3,933,454 A | * | 1/1976 | DeLuca .......................... 65/422 |
| 4,285,732 A | | 8/1981 | Charles et al. |
| 4,367,013 A | * | 1/1983 | Guerder et al. ............. 428/542.8 |
| 4,427,785 A | * | 1/1984 | Prochazka et al. ............ 501/128 |
| 4,687,969 A | | 8/1987 | Kajihara et al. |
| 4,842,626 A | * | 6/1989 | Barns et al. ..................... 65/426 |
| 4,948,538 A | * | 8/1990 | Wei et al. .......................... 264/6 |
| 5,424,609 A | | 6/1995 | Geven et al. |
| 5,609,666 A | * | 3/1997 | Heitmann ....................... 65/421 |
| 5,625,256 A | | 4/1997 | Tiedt et al. |
| 5,682,082 A | | 10/1997 | Wei et al. |
| 6,066,584 A | | 5/2000 | Krell et al. |
| 6,417,127 B1 | | 7/2002 | Yamamoto et al. |
| 6,841,497 B1 | | 1/2005 | Krell et al. |
| 6,878,456 B2 | | 4/2005 | Castro et al. |
| 2005/0184636 A1 | | 8/2005 | Wei |
| 2006/0169951 A1 | | 8/2006 | Van Bruggen et al. |
| 2007/0027026 A1 | | 2/2007 | Rhodes et al. |

FOREIGN PATENT DOCUMENTS

| | | |
|---|---|---|
| JP | 4-50160 A | 2/1992 |
| JP | 06-211569 | 8/1994 |
| WO | WO-2004/007397 | 1/2004 |
| WO | WO-2004/007398 | 1/2004 |

OTHER PUBLICATIONS

Harris, Daniel C. Materials for Infrared Windows and Domes. Bellingham, SPIE Optical Engineering Press, 1999. p. 28-35, 119-120, 159-163.*
Parish, Mark V., et al., "Nanograin Polycrystalline Alumina", Presented at the Tenth Electromagnetic Windows Symposium. Little Creek Amphibious Base, Norfolk, VA., (May 17-20, 2004).
Parish, M V., et al., "Aerodynamic IR Domes of Polycrystalline Alumina", *Window and Dome Technologies and Materials IX. Proceedings of SPIE*, vol. 5786, (Mar. 28-29, 2005), 195-205.
Pascucci, Marina R., et al., "Preparation and Properties of Nanograin Polycrystalline Alumina", *American Ceramic Society 106th Annual Meeting*, (Apr. 18-21, 2004).
Apetz, R et al., "Transparent Alumina: A Light Scattering Model", *Am. Ceram. Soc. Bull.* 81[4] 126, (2002).
Krell, A "Fracture Origin and Strength in Advanced Pressureless-Sintered Alumina", *J. Am. Ceram. Soc.* 81[7] 1900, (1998).
Krell, A et al., "High-Purity Submicron alpha Al2O3 Armor Ceramics Design; Manufacture; and Ballistic Performance", *Am. Ceram. Soc. Bull.* 80[7] 100, (2001).
Godlinski, D et al., "Transparent Alumina with Submicrometer Grains by Float Packing and Sintering", *J. Am. Ceram. Soc.* 85[10], (2002), 2449-56.
Hayashi, K et al., "Transmission Optical Properties of Polycrystalline Alumina with Submicron Grains", *JIM* 32[11] 1024, (1991).

(Continued)

*Primary Examiner* — Joseph S Del Sole
*Assistant Examiner* — Erin Snelting
(74) *Attorney, Agent, or Firm* — Brian M. Dingman; Dingman IP Law, PC

(57) ABSTRACT

Polycrystalline alumina and methods for manufacturing polycrystalline alumina exhibiting improved transmission in the infrared region. In one embodiment, polycrystalline alumina articles are formed by providing a powder of substantially alpha phase alumina having a grain size of up to about 1 μm, dispersing the powder in a liquid to form a slurry comprising powdered solids and liquid, removing excess of the liquid from the slurry to form a body, heating the body to provide a densified body, hot isostatically pressing the densified body under conditions to provide an article having a density of at least about 99.9% of theoretical density, and optionally annealing the article, wherein one or more of the annealing or heating are performed in an inert, dry gas.

20 Claims, No Drawings

OTHER PUBLICATIONS

Morinaga, K et al., "Fabrication of Fine alpha Alumina Powders by Thermal Decomposition of Ammonium Aluminum Carbonate Hydroxide (AACH)", *Acta. Mater.* 48, (2000), 4735-41.

Mizuta, H et al., "Preparation of High-Strength and Translucent Alumina by Hot Isostatic Pressing", *J. Am. Ceram. Soc.*, 75 [2], (1992), 469-73.

Echeberria, J et al., "Sinter-HIP of alpha-Alumina Powders with Sub-Micron Grain Sizes", *J. Eur. Ceram. Soc.* 22, (2002), 1801-1809.

Krell, A et al., "Transparent Sintered Submicrometer Al2O3 with IR Transmissivity Equal to Sapphire", *Proceedings SPIE*, Orlando, FL., (Apr. 2003).

Krell, A et al., "Transparent Sintered Corundum with High Hardness and Strength", *J. Am. Ceram. Soc* 86[1], (2003), 12-18.

Krell, A et al., "Processing of High-Density Submicrometer Al2O3 for New Applications", *J. Am. Ceram. Soc.* 86[4], (2003), 546-53.

Krell, A et al., "Subcritical Crack Growth in Al2O3 with Submicron Grain Size", *J. Eur. Ceram. Soc.* 23, (2003), 81-89.

PCT, PCT International Search Report—PCT/US05/35049, 2 pp.

PCT, "PCT Written Opinion—PCT/US05/35049", 6 pp.

Apetz, Rolf et al., "Transparent Alumina: A Light-Scattering Model", *J. Am.Ceram. Soc.*, 86(3), 2003, 480-486 pp.

Rhodes, W. H. et al., "Hot-Working of Aluminum Oxide: II, Optical Properties", *J. Am. Ceram. Soc.*, vol. 58, No. 1-2, Jan.-Feb. 1975, 31-34 pp.

\* cited by examiner

POLYCRYSTALLINE ALUMINA ARTICLES AND METHODS OF MANUFACTURE

CROSS REFERENCE TO RELATED APPLICATIONS

This application is a divisional application of U.S. application Ser. No. 11/240,069, filed on Sep. 30, 2005, which claims the benefit of the filing date of U.S. Provisional Patent Application No. 60/522,438 filed Oct. 1, 2004, the disclosures of which are hereby incorporated herein by reference.

STATEMENT OF FEDERALLY SPONSORED RESEARCH/DEVELOPMENT

This invention was made with Government support under contract number N68936-03-C-0011 awarded by the Department of Defense, NAVAIR Warfare Center Weapons Division, China Lake, Calif. The government has certain rights to the invention.

FIELD OF THE INVENTION

Embodiments of the invention relate to polycrystalline alumina (PCA) articles, for example, missile domes, missile windows and other infrared transmitting windows, having substantially no absorption peaks at wavelengths from about 2000 nm to about 5000 nm and methods of manufacturing such articles. Other embodiments relate to polycrystalline alumina articles having improved mechanical properties such as hardness and fracture toughness.

BACKGROUND OF THE INVENTION

Transparent ceramics such as transparent alumina articles are used in a wide variety of applications such as discharge lamps, supermarket scanner windows, window plates for furnaces, and military applications such as infrared transmitting windows, missile domes and missile windows.

As surveillance and tactical missions become more complex, there is a need to increase the performance of infrared (IR) systems to provide higher quality and higher resolution imagery. Typically, IR systems on tactical missiles are protected by optically transparent windows or domes, which are exposed to a broad range of environmental and operating conditions. The increasing sensor performance requires commensurate improvements in window performance, so that the window does not limit the imaging capability of the sensors. Missile domes are one of the most demanding applications for ceramics. Severe aero-thermal heating occurs as the missile accelerates to its programmed velocity, which necessitates the use of a material with excellent thermal shock resistance. Good thermal shock resistance is a function of the material's intrinsic physical properties and the extrinsic property of high strength coupled with high Weibull modulus—a combination that avoids premature dome failure. All of these physical properties must accompany a ceramic that is transparent over a broad range of wavelengths. The domes, therefore, require a wide band gap ceramic material in either the single crystal or polycrystalline form.

Water droplet impact damage is another consideration for materials exposed to the speeds and altitudes associated with supersonic flight. In addition, abrasion erosion due to sand particles can be a significant problem. The use of ceramics as windows and domes in IR missile systems requires extended service life without degradation of performance, more robust window and dome survivability (e.g., increased scratch resistance, strength, and thermal shock resistance), and low-cost manufacturing processes.

Historically, IR transmitting windows and domes have been fabricated from single crystal and large grain (>10 μm) ceramics including, for example, $MgF_2$, $MgAl_2O_4$, AlON and single crystal $Al_2O_3$ (sapphire). As noted above, thermal shock resistance is an important consideration, and due largely to its intrinsic properties of high thermal conductivity and low thermal expansion, alumina has higher thermal shock resistance than other candidate dome materials.

While all of these ceramics have been used successfully in this demanding application, each has its limitations in terms of optical and mechanical properties and price/performance trade-offs. Single crystal materials can be expensive and time-consuming to manufacture and machine into the appropriate shapes, and large grain polycrystalline materials often do not have adequate mechanical and thermomechanical properties to meet the increasing demands of hypersonic flight.

As surveillance and tactical missions become more vital and missile speeds increase, there is a need to increase the performance of infrared (IR) systems to provide higher quality imagery. Increasing missile velocities coupled with higher sensor performance requires commensurate improvements in window and dome performance, including hemispherical and ogive (aerodynamic) shapes. An ogive shape enables some combination of increased range, speed, and payload because of reduced drag. The ogive shape also offers improved rain impact resistance and sand erosion resistance and a greater unvignetted field of view. A method that will allow near-net shape processing of an aerodynamic dome using a material that has the benefits of sapphire is desired.

High-density, large grain-sized PCA material, routinely manufactured commercially for lamp envelopes and orthodontia brackets, is not suitable for dome applications since it is translucent due to birefringent scattering of light as it traverses through the many grain boundaries. This intrinsic property results from the hexagonal crystal structure of alumina. The objectionable birefringence is eliminated as the grain size approaches the wavelength of light.

Thus, there is a need to provide novel transparent polycrystalline alumina articles exhibiting improved mechanical and optical properties, particularly for use in missile domes and windows, as well as a need for improved processes for forming such articles. There is a further need to provide such articles that do not exhibit absorption peaks in the transmittance range required. For applications requiring transmittance in the mid-wave infrared (MWIR) the articles should have substantially no absorption peaks from about 2000 nm up to about 5000 nm.

SUMMARY OF INVENTION

One aspect of the present invention relates to a method of manufacturing alumina articles comprising providing a powder of substantially alpha phase alumina having a grain size of up to about 1 μm; dispersing the powder in a liquid to form a slurry comprising powdered solids and liquid; adding one or more sintering aids; removing excess of the liquid to form a green body; heating the green body at a temperature of at least about 600° C. for at least about 1 hour to provide a prefired body; sintering the prefired body at a temperature and time to provide a sintered body having a density greater than about 95.5% of theoretical density; hot isostatically pressing the sintered body at a pressure of at least about 15,000 psi gas pressure at a temperature of at least about 1225° C. to provide a densified body; and optionally annealing the densified body at a temperature of at least about 1100° C. for at least about 28 hours to provide the polycrystalline alumina article, wherein one or more of sintering the green body and annealing the densified body are performed in a dry inert gas.

In one or more embodiments, the annealing step is performed in a dry gas. In other embodiments, an annealing step is not performed. According to one or more embodiments, the polycrystalline alumina article has a density of at least about 99.9% of theoretical density and exhibits a hardness of at least about 25 GPa and a fracture toughness of at least about 2.6 MPa m$^{1/2}$.

In one or more embodiments, the method further comprises adding to the slurry one or more sintering aids selected from the group consisting of MgO in a concentration of between about 25 ppm and about 3000 ppm by weight of the solids, $Y_2O_3$ in a concentration of between about 25 ppm and about 3000 ppm by weight of the solids, and $ZrO_2$ in a concentration of between about 25 ppm and 3000 ppm by weight of the solids. The method may further comprise shaping the article into the form of a window or a dome exhibiting an in-line transmission of a) at least about 83.9% for a sample 2 mm thick when exposed to light at a wavelength of about 3000 nm; and/or b) at least about 86.4% for a sample 2 mm thick when exposed to light at a wavelength of about 4000 nm.

In certain embodiments, the excess liquid is removed by a casting method. In specific embodiments, the excess liquid is removed by pressure casting. In other specific embodiments, the green body is heated at temperatures between about 600° C. and about 1000° C. In one or more embodiments, the heated green body is sintered in an atmosphere comprising dry $H_2$.

In a specific embodiment, the heated green body is subjected to hot isostatic pressing for about two hours at a pressure of at least about 15,000 psi in gas at temperatures in the range of about 1225-1325° C. In other specific embodiments, the article is annealed in dry inert gas at a temperature of about 1100° C. for at least 28 hours.

In another embodiment, a method for manufacturing a polycrystalline alumina article comprises: providing a powder of substantially alpha phase alumina having a grain size of up to about 1 μm; dispersing the powder in a liquid to form a slurry comprising powdered solids and liquid; removing excess of the liquid from the slurry to form a body; heating the body to provide a densified body; hot isostatically pressing the densified body under conditions to provide an article having a density of at least about 99.9% of theoretical density; optionally annealing the article; and shaping the article in the form of a window or dome, wherein one or more of heating the body and annealing the article are performed in a dry inert gas atmosphere. In a specific embodiment, heating the body is conducted at a temperature and time to achieve closed porosity in the body.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Embodiments of the invention provide improved polycrystalline alumina (PCA) articles, which are particularly useful in military applications such as infrared transmitting windows, missile domes and missile windows. According to embodiments of the invention, polycrystalline alumina is provided that exhibits aerothermal performance comparable to or better than sapphire. Polycrystalline alumina also offers the opportunity for powder-based manufacturing, which is generally lower cost than processing associated with single crystal sapphire. Polycrystalline alumina articles according to embodiments of the present invention exhibit high strength, high hardness, high toughness and high Weibull modulus all being a function of the PCA microstructure. The strength and Weibull modulus can be improved to values comparable to sapphire by processing polycrystalline alumina to a fine grain size, and the resulting PCA material will have high thermal shock resistance.

The term "domes" typically refers to dome shapes made from these materials which are placed on the front end of missiles to protect the IR detectors which are designed to fly at very high speeds. Exemplary dome shapes include hemispheric and ogive (aerodynamic) shapes.

One aspect of the present invention relates to polycrystalline alumina articles. Another aspect of the invention relates to methods for manufacturing such polycrystalline alumina articles.

In one aspect, the invention discloses a method of producing PCA articles having submicron-size grains and substantially no absorption when exposed to light at wavelengths from about 2000 nm to about 5000 nm.

As a starting material, commercially available $Al_2O_3$ powders having crystallite sizes less than about 0.5 □m can be used. These powders usually contain transitional phases such as gamma or delta in addition to alpha, the high temperature stable hexagonal phase. According to one embodiment, submicron powder that is essentially 100% alpha phase is used as a starting material. In addition, powders for optical ceramics must be high purity, such as at least 99.9% pure, more preferably, at least 99.97% pure. TAM-DAR powder, available from Taimei Chemicals Co., Ltd., Japan, is an example of a suitable starting material having high alpha phase content and high purity.

The powders used as starting materials are typically somewhat agglomerated. The individual crystallites are slightly bonded in some cases forming a larger particle than desired. The bonding is a natural consequence of calcining the precursor salt, ammonium aluminum carbonate hydroxide ($NH_4AlCO_3(OH)_2$), not only to decompose it, but also to transform it to 100% alpha phase. The agglomerates are of two types: soft agglomerates and hard agglomerates. Soft agglomerates can be broken apart by some mechanical process such as sonification or ball milling. Hard agglomerates are well sintered, and usually cannot be broken into their individual crystallites. Filtering or sedimentation can eliminate them. According to one embodiment of the invention, hard agglomerates are eliminated and soft agglomerates are broken apart by the methods described above.

According to one or more embodiments, the powder is dispersed to form a water-based slurry. Organic-based slurries may also be used. Examples of suitable organic liquids include, but are not limited to, alcohols and aldehydes such as methanol, ethanol, propanols, and benzaldehyde. A small amount, for example, less than about 1-3% by weight of a dispersant can be added to the slurry. Suitable dispersants include, for example, organic acids (benzoic acid and hydroxybenzoic acids, linoleic acid, citric acid which can be obtained from Sigma-Aldrich Co.) or acrylics, acrylic polymers, and acrylic co-polymers. Preferred dispersants include hydroxybenzoic acid, the acrylic polymers Darvan 821 and Darvan C sold by RT Vanderbilt Co. and Narlex sold by National Starch and Chemical Company, and sorbitan trioleates including Span 85 from ICI Group. The best results were obtained with hydroxybenzoic acid—alcohol solutions and acrylic copolymer—water solutions. Addition of the dispersant is not essential but it assists in keeping the powder in suspension during the subsequent forming operation. The slurry at this point is about 15 volume percent solids and has a very low viscosity, which is substantially equivalent to milk. The slurry can also be concentrated by removing some of the liquid to increase the solids loading up to about 60 volume percent. Sintering aids such as MgO, $Y_2O_3$ and/or $ZrO_2$, in amounts ranging from 25 ppm to 3000 ppm by weight may be added to the slurry to improve the final properties of the articles. Each of these additives may be added alone or in combination with one or more of the other additives.

Various shapes have been formed by filter casting or pressure casting. The slurry was poured into a funnel covered by 0.2 μm filter paper upon which the slurry was collected. In filter casting, vacuum was pulled underneath the funnel and the water vehicle flowed through the filter into a container. A semi-solid cake slowly formed above the filter paper. After the last of the free water was pulled through, the cake was allowed to air dry prior to removal from the casting device.

Alternatively, one can use pressure casting, which is quite similar to filter casting, except that air pressure is applied above the slurry to assist in forming the cake. A combination of both vacuum and pressure may also be used to form the cakes. Care must be taken in removing the samples to avoid bending or cracking. A person skilled in the art will appreciate that a number of additional ceramic processes could be utilized in forming desired shapes. These include, but are not restricted to, gel casting, freeze casting, slip casting, centrifugal casting, extrusion, injection molding, and isostatic pressing. The invention is not limited to a specific forming method. However, the dry density of the sample should be over 50% and preferably over 55% of theoretical density after forming.

According to one or more embodiments, the dried samples are then prefired by heating at temperatures from about 600° C. to about 1000° C., holding the samples for one to twelve hours or longer and oven cooling (natural cooling curve after switching off the power). All temperatures within that range produced transparent polycrystalline alumina compositions but a peak temperature of 800-900° C. is presently preferred.

In one or more embodiments, the prefired samples are then ready for densification, which may be performed in two steps. According to one embodiment, the first densification step includes sintering. In this step, the goal is to densify to greater than about 95.5% but less than about 100% of theoretical density. It is desirable to reach closed porosity, that is, a condition where gases or liquids have no direct path to reach internal pores. According to one or more embodiments, a second densification step including hot isostatic pressing (HIPing) is performed to achieve closed porosity with minimal grain growth. HIPing enables the production of articles with near 100% theoretical density at the smallest grain size possible. Sintering and densification also results in the decomposition of volatile residual chemical species such as carbonates remaining from the powder synthesis step. It is desirable that such species be decomposed and volatilized from the sample prior to reaching closed porosity. It is also important to prevent other contaminants such as hydroxyls from bonding with the $Al_2O_3$ lattice. Decomposition of species and prevention of hydroxyl bonding is important to avoid undesirable absorption peaks in the infrared spectrum between about 2000 nm and 5000 nm. In the event that there are remaining absorption peaks, some absorption peaks can be removed subsequently by annealing in a controlled atmosphere. By varying the temperature, time, heating rate, intermediate hold times, atmosphere, and the addition of sintering aids, transmittance can be maximized and absorption peaks can be removed during the sintering process or post-sinter annealing.

HIPing is accomplished by stacking the samples in an $Al_2O_3$ crucible, which may be separated by thin sheets of molybdenum metal and surrounded by coarse high purity $Al_2O_3$ setter powder. The metal sheet prevents the samples from sticking together and the setter powder insures the purity of the samples during HIPing by absorbing any furnace impurities. Under some conditions, the molybdenum separators and setter powder may not be necessary during HIPing. HIPing is accomplished in the examples described below by heating the samples to 1250-1300° C. in 15,000-30,000 psi Argon and holding typically for 2 hours, though other HIP conditions could produce similar results. HIPed samples are greater than about 99.90% and preferably greater than about 99.93% of theoretical density.

It will be understood by those skilled in the art that the heating steps described above (prefire, sinter, HIP and annealing) may be combined into a continuous heating cycle to achieve the same result. The invention is not limited to a particular heating schedule or series of heating steps, so long as the desired high transmittance and lack of absorption peaks in the infrared range of about 2000 nm to about 5000 nm are achieved.

After the samples have been formed into densified articles, such as domes or windows, which may be in a variety of shapes such as hemispherical or ogive domes, or flat or curved windows, the samples are then ready for machining and polishing. According to one embodiment of the invention, the samples are finished to either 0.8 mm or 2 mm thickness. The thinner samples are used for comparative studies while the thicker samples represent a thickness closer to the application thickness. The thicker samples gage the acceptability of the material for infrared applications. If the samples contain an OH absorption band, such bands may be removed by annealing at about 1100° C. for an extended time, such as, for example, 28 hours. The annealing may be performed in a dry inert gas atmosphere. We have studied the OH diffusion rate "D" experimentally, and we found the diffusion rate to be $D=6\times10^{-8}$ cm$^2$/sec. An understanding of the diffusion rate permits calculation of the necessary annealing time for various sample thicknesses.

In one or more embodiments, the annealing step may be eliminated. In certain embodiments, the first sintering atmosphere governs the presence of the OH band. According to one or more embodiments, some sintering atmospheres do not result in an OH absorption band. For example, as will be seen from the Examples below, sintering in a dry hydrogen atmosphere produces an article that does not exhibit an OH absorption band.

Without intending to limit the invention in any manner, the present invention will be more fully described by the following examples.

Example 1

Fifty (50) grams Taimei TM-DAR powder, 100 ml distilled water, and 500 g high purity alumina milling media were measured into a 500 ml polyethylene jar. To this was added less than about 1 weight percent acrylic copolymer dispersant and appropriate amounts of MgO and $Y_2O_3$ to yield approximately 100 ppm by weight of each sintering aid in the cast sample. The jar was placed on a roller mill for several hours, after which the milling media was filtered out and the slurry was poured into several 100 ml polyethylene containers. The slurry portions were allowed to sit for 1-4 days and then filter cast to form disks about 35 mm diameter and 1-3 mm thick. The disk was prefired by heating in air at 100° C./hour to 700° C., held for 2 hours followed by furnace cooling. The prefired disk was placed on an $Al_2O_3$ tray with a small amount of coarse high purity $Al_2O_3$ powder separating the disk from the tray. The disk was heated in a wet hydrogen atmosphere to 700° C. in 1 hour followed by a reduced heating rate to approximately 1300° C. in 2 hours. The furnace was held at approximately 1300° C. for 2 hours followed by a 2 hour cooling cycle. The sample was HIPed at 1300° C. for 2 hours at 30,000 psi in Argon. The sample was polished to 0.8 mm thickness, and measured for optical transmission. The in-line transmission was measured from about 400 nm to 2000 nm using a Perkin Elmer Lambda 900 Spectrophotometer and from 2000 nm to 5000 nm using a Brucker 66IFS FTIR. As noted in Table 1, the transmission was excellent over a broad range of wavelengths and particularly high at 4000 nm. The spectrum did contain a broad OH absorption from about 2700 nm to about 3700 nm.

Example 2

A prefired disk was prepared as in Example 1, except an appropriate amount of MgO was added to the slurry to yield approximately 300 ppm MgO and 100 ppm $Y_2O_3$ by weight in the sample. The prefired sample was again sintered in wet $H_2$, but at 1275° C. for 2 hours. The disk was HIPed as described in Example 1. However, the sample was ground and polished to 2 mm thickness. The in-line transmittance of the sample was measured as in Example 1. Initially, the sample showed OH absorption, so it was annealed in flowing dry $N_2$ at 1100° C. for 58 hours. The OH absorption was almost entirely eliminated. The transmittance values are shown in Table 1.

Example 3

A slurry similar to that used in Example 2 was prepared. The disk was prepared by pressure casting at 40 psi, and was prefired at 800° C. The prefired sample was sintered in the same manner as Example 2 and HIPed the same way as in Examples 1 and 2. It was subsequently annealed at 1100° C. in flowing dry $N_2$ for 50 h. Transmittance values, measured the same way as in Examples 1 and 2, for the polished 2 mm thick disk are shown in Table 1.

Example 4

This sample contained approximately 300 ppm of MgO and 300 ppm of $ZrO_2$ (both by weight) as sintering aids. It was prepared by filter casting as in Example 1 and prefired at 800° C. It was sintered the same way as Example 2 and HIPed the same way as Example 1. The sample was not annealed in $N_2$, and it showed OH absorption. Transmittance values (measured in accordance with Examples 1-3) for the 0.8 mm thick sample are shown in Table 1.

Example 5

This sample was prepared the same as Example 1 but it contained only 300 ppm MgO and it was prefired at 800° C. It was sintered the same as Example 2. However, it was HIPed at 1250° C. for 2 hour at 30,000 psi. It was annealed in flowing dry $N_2$ for 28 hours at 1100° C. The transmittance (measured as in Examples 1-4) of this 0.8 mm thick sample is shown in Table 1.

Example 6

This sample was prepared the same as Example 1, but it contained only 300 ppm MgO and it was prefired at 900° C. for 2 hours. The sintering was conducted at 1275° C. for 2 h in an air atmosphere. HIPing was conducted as in Example 2. The sample contained an OH absorption peak. The overall transmittance of this 0.8 mm thick sample measured in accordance with Examples 1-5 is shown in Table 1.

Example 7

This sample was prepared the same as Example 1 except it contained only 300 ppm MgO and prefiring was conducted at 800° C. Sintering was conducted in a dry $H_2$ atmosphere. The prefired disk was heated to 700° C. in 1 hour followed by heating to 1275° C. in 2 hours, and held at temperature for 2 hours before cooling in 2 hours. The sample was HIPed as in Example 1. This sample did not have an OH absorption. This 0.8 mm thick sample possessed the excellent optical properties shown in Table 1 and measured the same way as in Examples 1-6.

TABLE 1

Percent In-Line Transmittance versus Wavelength

| Example No. | 645 nm | 2000 nm | 3000 nm | 4000 nm | 5000 nm | Thickness |
|---|---|---|---|---|---|---|
| 1 | 55.6 | 85.6 | 85.7[1] | 87.5 | 83.5 | 0.8 mm |
| 2 | 35.7 | 82.2 | 83.9 | 86.4 | 75.3 | 2.0 mm |
| 3 | 42.2 | 84.6 | 86.0 | 87.5 | 75.6 | 2.0 mm |
| 4 | 54.0 | 85.4 | 85.4 | 87.2 | 83.2 | 0.8 mm |
| 5 | 59.7 | 84.5 | 86.1 | 87.6 | 83.9 | 0.8 mm |
| 6 | 51.9 | 86.1 | 85.6 | 87.5 | 83.5 | 0.8 mm |
| 7 | 52.1 | 86.8 | 87.3 | 88.9 | 85.0 | 0.8 mm |
| Sapphire | 85.8 | 87.7 | 87.9 | 87.8 | <70 | 3.17 mm |
| Sapphire* | | | 88.0 | 88.2 | | 2.0 mm |
| Sapphire | 86.1 | 88.4 | 87.8 | 88.2 | 79.4 | 1.53 mm |

*Calculated values.

As can be seen from Table 1, the transmittance values for Examples 2 and 3 are within about 2% of sapphire at 4000 nm. In addition, for Examples 2 and 3, transmittance values from 3000 nm to 4000 nm are within 5% of the value of sapphire.

Total transmittance is defined as all the radiation transmitted over a 180° arc in the forward direction. For most applications of this material, specular transmission will be more important, but we thought it instructive to characterize the total transmittance on selected samples. Total transmittance was measured using a Cary spectrophotometer and the data are reported in Table 2. The total transmittance is much higher than the in-line transmittance in the visible region, and the spread between total and in-line narrows with increasing wavelength. This is another consequence of birefringent scattering, and is further proof that although minimized, birefringence influences transmittance at wavelengths near the grain size of the PCA.

TABLE 2

Percent Total Transmittance versus Wavelength

| Example No. | 450 nm | 645 nm | 2000 nm | 2500 nm |
|---|---|---|---|---|
| 4 | 67.3 | 72.8 | 84.1 | 84.7 |
| 5 | 70.7 | 78.8 | 85.4 | 86.0 |
| 6 | 65.9 | 73.6 | 85.1 | 85.3 |
| 7 | 66.9 | 74.6 | 84.2 | 85.4 |

Examples 8-12 Grain Size Measurement

Grain size was characterized on a number of samples. Grain size is important as discussed earlier to minimize the effect of birefringence. Representative grain sizes for several samples, along with their thermal history, are shown in Table 3. These grain sizes were measured from scanning electron microscopy (SEM) calibrated photographs by the well-accepted lineal intercept method where the average lineal intercept was multiplied by 1.5 to correct for statistical factors.

TABLE 3

Grain Sizes of Sintered and HIPed Samples

| Example No. | Sinter Temperature (° C.) | Sinter Time (hours) | HIP Temperature (° C.) | HIP Time (hours) | Grain Size (μm) |
|---|---|---|---|---|---|
| 8 | 1300 | 2 | 1300 | 2 | 0.89 |
| 9 | 1275 | 2 | 1300 | 2 | 0.67 |
| 10 | 1300 | 2 | 1275 | 2 | 0.63 |
| 11 | 1300 | 2 | 1250 | 2 | 0.36 |
| 12 | 1275 | 2 | 1275 | 2 | 0.26 |

These samples were prepared similarly to those described in Examples 1-7, but with the sinter and HIP conditions as described in Table 3 and the sintering additives as follows. Examples 8 and 9 contained only the MgO sintering aid (500 ppm and 300 ppm by weight, respectively), while examples 10-12 contained both 300 ppm MgO and 100 ppm $Y_2O_3$ by weight. The grain sizes correlate most rigorously with combined thermal cycle. It is thought that the presence of $Y_2O_3$ contributes to a smaller grain size for a given thermal cycle. The smaller grain sizes give higher transmission values, particularly in the visible and low wavelength infrared range. The presence of the $ZrO_2$ sintering aid was not shown to improve optical performance, but it may prove essential as a grain growth inhibitor for some applications where transparent alumina is exposed to high temperatures for long times.

Mechanical properties (hardness and indentation fracture toughness, IFT) have been measured by the Vickers indentation technique employing a 1 kg load. Hardness was measured on numerous samples (examples 5, 8, and 9 from above). There was very little spread in the data, and the average hardness was 25.1 GPa. This value is approximately 15% higher than the value of 22 GPa reported for sapphire (D.C. Harris, Materials for Infrared Windows and Domes: Properties and Performance, SPIE Press, 1999). Hardness is an important attribute for wear, abrasion, or impact resistance. Indentation fracture toughness was measured on three transparent samples (examples 5, 8, and 9 from above) and the results showed $K_{Ic}$ values of 2.64, 2.60, and 2.72 MPa m$^{1/2}$. This is about 30% higher than the fracture toughness of 2.0 MPa m$^{1/2}$ reported for sapphire (D.C. Harris, ibid.). One high density, but not fully transparent sample measured $K_{Ic}$=3.53 MPa m$^{1/2}$ indicating some microstructural modifications of this material can be extremely tough. Toughness is important for the mechanical application mentioned above, but also for thermal shock resistance. In addition, high toughness, and in particular high hardness, are important attributes for applications requiring high ballistic performance, for example, in articles used for armor applications, such as vehicle armor, aircraft armor and body armor.

The flexural strength was measured and the Weibull modulus was calculated. Strength was measured in 4-point bending according to ASTM standard C1161-02c using type A specimen bars. Bars were machined from articles processed similarly to Examples 5, 7, and 9. Twenty (20) bars were tested in the as-machined state, and twenty (20) bars were annealed after machining (12 hours at 1050° C.) and then tested. The data in Table 4 show high strength and high Weibull modulus, both of which improve after annealing.

TABLE 4

Strength and Weibull Modulus

|  | Average Strength (MPa) | Standard Deviation | Weibull Modulus |
|---|---|---|---|
| As-Machined | 505 | 65.7 | 8.3 |
| Annealed | 538 | 49.9 | 12.2 |

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A method for manufacturing a transparent polycrystalline alumina article comprising:
    providing a powder of substantially alpha phase alumina;
    dispersing the powder in a liquid to form a slurry comprising powdered solids and liquid;
    adding one or more sintering aids;
    removing excess of the liquid to form a green body;
    heating the green body at a temperature of at least about 600° C. for at least about 1 hour to provide a prefired body;
    sintering the prefired body at a temperature of from about 1275 to about 1300° C. in a dry hydrogen-containing gas atmosphere for a time that is sufficient to provide a sintered body having a density greater than about 95.5% of theoretical density;
    hot isostatically pressing the sintered body at a pressure of at least about 103 MPa (15,000 psi) gas pressure at a temperature of at least about 1225° C. to accomplish a density greater than about 99.90% of theoretical density; and
    annealing the hot isostatically pressed body in a flowing dry inert gas at about 1100° C. for a time calculated using a diffusion rate of about 6×10$^{-8}$ cm$^2$/second such that the resultant transparent polycrystalline alumina article has substantially no OH$^-$ absorption band when exposed to light at wavelengths from between about 2000 nm and about 5000 nm.

2. The method of claim 1, wherein the polycrystalline alumina article has a grain size in the range from about 0.26 μm to about 0.89 μm.

3. The method of claim 1, wherein the polycrystalline alumina article exhibits in-line transmission values of within about 5% of those obtained for sapphire when exposed to light at wavelengths of from about 3000 nm to 4000 nm.

4. The method of claim 1, wherein the polycrystalline alumina article has a density of at least about 99.9% of theoretical density and exhibits a hardness of at least about 25 GPa and a fracture toughness of at least about 2.6 MPa m$^{1/2}$.

5. The method of claim 1, wherein the one or more sintering aids are selected from the group consisting of MgO in a concentration of between about 25 ppm and about 3000 ppm by weight of the solids, $Y_2O_3$ in a concentration of between about 25 ppm and about 3000 ppm by weight of the solids, and $ZrO_2$ in a concentration of between about 25 ppm and 3000 ppm by weight of the solids.

6. The method of claim 1, wherein the article is in the form of an infrared transmitting window or dome and exhibits an in-line transmission of:

a) at least about 83.9% for a sample 2 mm thick when exposed to light at a wavelength of about 3000 nm; and/or b) at least about 86.4% for a sample 2 mm thick when exposed to light at a wavelength of about 4000 nm.

7. The method of claim 1, wherein the excess liquid is removed by a casting method.

8. The method of claim 1, wherein the excess liquid is removed by pressure casting.

9. The method of claim 1, wherein the green body is heated at temperatures between about 600° C. and about 1000° C.

10. The method of claim 9, wherein the prefired body is sintered in an atmosphere comprising dry $H_2$.

11. The method of claim 1, wherein the sintered body is subjected to hot isostatic pressing for about two hours at a pressure of at least about 103 MPa (15,000 psi) in gas at temperatures in the range of about 1225-1325° C.

12. A method for manufacturing a transparent polycrystalline alumina article comprising:

providing a powder of substantially alpha phase alumina;

dispersing the powder in a liquid to form a slurry comprising powdered solids and liquid;

removing excess of the liquid from the slurry to form a body;

heating the body to provide a densified body;

hot isostatically pressing the densified body under conditions to provide an article having a density of at least about 99.9% of theoretical density; and annealing the article in a flowing dry inert gas atmosphere at about 1100° C. for a time calculated using a diffusion rate of about $6 \times 10^{-8}$ cm$^2$/second such that the resultant transparent polycrystalline alumina article has substantially no $OH^-$ absorption band when exposed to light at wavelengths from between about 2000 nm and about 5000 nm.

13. The method of claim 12, wherein heating the body is conducted at a temperature and time to achieve closed porosity in the body.

14. The method of claim 12, wherein hot isostatically pressing is performed for about two hours at 103-207 MPa (15,000-30,000 psi) in gas at temperatures between 1225-1325° C.

15. The method of claim 14, wherein the article has a hardness of at least about 25 GPa and a fracture toughness of at least about 2.6 MPa m$^{1/2}$.

16. The method of claim 12, wherein the polycrystalline alumina article exhibits an in-line transmission of at least about 83.9% for a sample 2 mm thick when exposed to light at a wavelength of about 3000 nm and/or an in-line transmission of at least about 86.4% for a sample 2 mm thick when exposed to light at a wavelength of about 4000 nm.

17. The method of claim 12, wherein the article is annealed for at least 28 hours.

18. The method of claim 12, wherein the polycrystalline alumina article is in the form of an infrared-transmitting window or dome and has a grain size in the range from about 0.26 µm to about 0.89 µm.

19. The method of claim 12, wherein the polycrystalline alumina article exhibits in-line transmission values of within about 5% of those obtained for sapphire when exposed to light at wavelengths of from about 3000 nm to 4000 nm.

20. The method of claim 12, further comprising adding to the slurry one or more sintering aids selected from the group consisting of MgO in a concentration of between about 25 ppm and about 3000 ppm by weight of the solids, $Y_2O_3$ in a concentration of between about 25 ppm and about 3000 ppm by weight of the solids, and $ZrO_2$ in a concentration of between about 25 ppm and 3000 ppm by weight of the solids.

* * * * *